3,278,358
PROCESS AND APPARATUS FOR THE CONTINUOUS HEAT SEALING OF PLASTIC SHEETING
Horst Rosewicz, Ludwigshafen (Rhine), and Gernot Manhart, Limburgerhof, Pfalz, Germany, assignors to Badische Anilin- & Soda-Fabrik Aktiengesellschaft, Ludwigshafen (Rhine), Germany
Filed Dec. 11, 1961, Ser. No. 158,194
3 Claims. (Cl. 156—306)

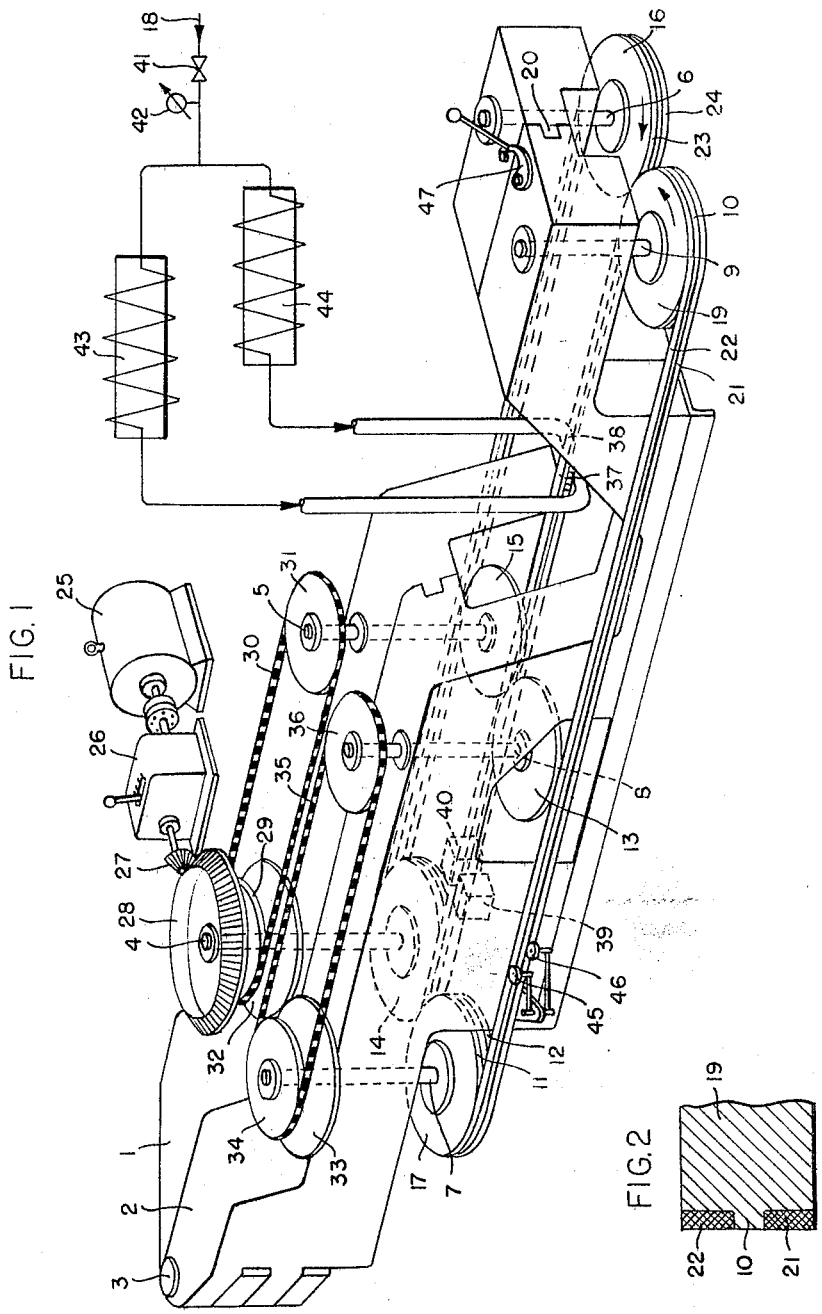

This invention relates in general to a new process for heat sealing plastic sheeting to form packaging materials. More specifically the invention relates to a new and improved process for continuously heat sealing plastic sheeting for the production of bags for powdery bulk goods.

It is known to close bags, bag liners and containers made of plastics by heat sealing the open end. This is done either by the heat impulse method or high frequency current. Difficulties occur when the parts to be heat sealed have very dusty inner faces. It is extremely difficult to effect a satisfactory heat seal of dusty parts, for example bags, with the speed usual in the bulk goods' industry.

This is especially the case when the parts to be heat sealed consist of polyethylene, particularly as this material cannot be heat sealed by high frequency methods. Contrasted with polyvinyl chloride which has a dielecric constant of 4 and a heat factor of 0.25, the corresponding values of 2.3 and 0.001 for polyethylene, and the values for the dissipation factor tan $\sigma$ of 0.0150 for polyvinyl chloride and 0.0003 for polyethylene at $10^4$ cycles per second show that polyethylene cannot be heated to a high enough temperature in a high frequency field. Heat sealing machines built for polyethylene sheeting therefore usually operate by the heat impulse method. Such apparatus work intermittently and are therefore unsuitable for conveyor line operation. They are constructed as tongs and only one jaw of the tongs carries a plastic covered resistance wire. Under the pressure of the closed jaws, an electric current impulse heats up the resistance wire for a short time and thus causes the sheeting to melt. The sheeting then immediately cools. Only by thus cooling the sheeting prior to opening the jaws is it possible to ensure that the sheeting detaches itself from the resistance wire.

When using two resistance wires in a tongs apparatus, i.e., one wire per jaw, there is a risk that the heated sheeting may be penetrated. It is for this reason that apparatus with only one resistance wire is used. The molten sheeting partly melts the adjacent sheeting. However when operating speeds are high and thick sheeting is used, heating from both sides is more advantageous for a rapid transfer of a sufficient amount of heat, especially as heat sealing requires that the inner faces of the sheeting should be heated or in other words that the entire thickness of the sheeting should be fused. Complete softening on both sides is moreover essential when, as in the case of powdery bulk goods, a fine film of dust lies as an insulating layer between the adjacent faces of the sheeting. Machines are also known in which resistance wires are replaced by metal rollers pressed on by means of resiliently mounted rollers of heat resistant rubber. Although these machines operate continuously, they have all the other disadvantages of machines using tongs because they operate on the same principle.

The thickness of the sheeting and the speed of sealing are moreover limited because at a high sealing rate the transfer of heat must take place very rapidly and when the sheeting is very thick a large amount of heat must be supplied per unit of surface area. This can only be achieved by a high heat transfer coefficient or a high temperature of the metal roller. The roller must be continuously wetted with silicone oil to prevent it sticking to the softened sheeting, but this is only effective up to a certain temperature. Since in this arrangement, only one sheeting is fused on the cold opposite side, reliability of sealing is very slight in the case of dusty sheeting.

It is an object of the present invention to provide a process for continuously and automatically heat sealing packaging material of plastic sheeting for bulk goods, for example bags. Another object of the invention is to provide a process for more reliably heat sealing packaging materials for powdery bulk goods. A further object of the invention is to provide a heat sealing process in which heating can be commenced at the joint in a very short and accurately controllable time and rapidly discontinued again. Another object of this invention is to provide a heat sealing machine for carrying out the said process.

In accordance with this invention the said objects are achieved by gripping the parts to be sealed by moving steel bands and conveying them under reciprocal pressure to successive treatment points where they are first heated by means of hot compressed air at the seam and heat sealed to each other by the pressure of the compressed air, cooled for a short time externally by the atmosphere during further conveyance and pressed together mechanically at the seam so that any parts of the seam which may have escaped being united are completely heat sealed and are finally ejected in heat sealed condition by the moving steel bands.

The heat required for heat sealing is applied to the seam externally on both sides by heated compressed air blown through two opposite nozzles having small orifices and arranged a short distance above the sheeting. The air required for heat sealing leaves the nozzles at such a speed that its pressure unites the two parts to be heat sealed without the necessity for pressing the softened parts together by a solid jaw or roller acting as a pressing member. Sticking of the heated sheeting to the heat transferring member is therefore impossible.

After the seam which has become substantially plastic has been pressed together by compressed air, it is pressed together by fluted wheels. For this purpose it is necessary to cool the outer parts of the sheeting so that they are more solid than the inner layers.

To prevent weakening of the seam, the resiliently mounted fluted wheels, made of plastic, are not pressed on during the melting process but are pressed onto both sides only after the melting process. Thus the seam is subjected not only to the resilient pressure of compressed air in the sealing zone, but is also subsequently subjected to a second and higher pressure by a solid member acting on the seam which has now solidified on the outside but still remains soft and moldable on the inside.

An apparatus suitable for carrying out the process of this invention is characterised especially by a frame consisting of two parts the movable part of which is connected with the stationary part by a hinge and a closing lever and is secured by engagement of a shaped projection of the movable part in a groove in the stationary part, four endless steel bands driven by superimposed gear wheels or bevel gears and running horizontally in pairs at a distance apart corresponding to the width of the welded seam, said bands being reciprocally pressed together, two stationary wide slit jets mounted on both sides of the bands in the gap between the pairs of bands at a short distance from the sheeting at the height of the welding seam, said nozzles having openings corresponding to the width of the welded seam, two heated air preheaters connected by pipes to the nozzles, said preheaters being for heating up compressed air required for heat sealing, and two plastic rollers rotating in the same horizontal plane and applying reciprocal resilient pressure to the seam in the gaps between the bands.

Apparatus for carrying out the invention is shown by way of example in the accompanying drawing.

FIGURE 1 is a perspective view of an apparatus for the continuous heat sealing of plastic sheeting.

FIGURE 2 shows a fragmentary cross-sectional view of one of the rotating metal discs.

This apparatus comprises a two-part frame having a stationary part 1 and a movable part 2. The movable part is rotatably mounted on a hinge 3. In each part of the frame three vertical shafts 4, 5, 6 and 7, 8, 9 are mounted. The outer shafts 4, 6 and 7, 9 carry horizontally rotating metal discs 14, 16 and 17, 19, which have at their peripheries two recesses 11 and 12 separated by a raised step 10 (FIGURE 2); these recesses accommodate and guide four steel bands 21–24 arranged in two pairs, one above the other. The central shafts 5 and 8 each carry a pressing roller 13 and 15 made of plastic. The bands are moved by means of a motor 25 which drives the shaft 4 through a gear 26 and a pair of bevel gears 27, 28. Shaft 5 is driven from a pulley 29 mounted on shaft 4 by means of a V-belt 30 and a pulley 31 mounted on shaft 5, and shaft 7 is driven by a pair of gear wheels 32, 33. Shaft 8 is driven from shaft 7 by pulleys 34, 36 and V-belt 35. Steel bands 21, 22, 23 and 24 are driven in this way over metal discs 14, 16, 17 and 19.

The four endless steel bands are responsible for conveyance and lateral guiding of the parts to be heat sealed. The seam in the two lengths of sheeting is situated between the two pairs of bands arranged one above the other. Two wide slit nozzles 37 and 38 are provided at the same height as the seam. These nozzles are opposite to each other and heated jets of compressed air are directed therethrough perpendicularly onto the seam in the two parts to be welded. Depending on the thickness of the sheeting, the pressure of the compressed air is 0.5 to 1 atmosphere gauge, and the speed of the bands is 12 to 30 meters per minute. After the steel bands have passed through the hot air zone, they are cooled by metal jaws 39 and 40 which are water-cooled and resiliently pressed against the steel bands.

Compressed air is passed through a pipe 18, a regulating valve 41 and a pressure gauge 42 to two regulatable preheaters 43 and 44 and heated therein to the required temperature. The heating power of one preheater is about 1.5 to 2.5 kw.

Resiliently mounted profiled pressing rolls 13 and 15 are situated about 20 cm. behind the compressed air nozzles reckoned in the direction of movement of the bands. Four tension rolls are provided to keep the four steel bands under tension; two of these, 45 and 46, are shown and the other two are mounted in the equivalent position on the other side of the apparatus. Tension on each individual band may thus be regulated independently of the other bands. A shaped projection 20 on the stationary part of the frame engages in a groove in the movable part of the frame and thus provides security against relative displacement of the two parts. The two parts of the frame are locked together by a closing lever 47.

Operation of the apparatus is as follows:

The parts to be heat sealed are offered to the two metal discs 16 and 19, grasped by the four bands 21–24, pressed together and conveyed to the two wide slit jets 37, 38. Heated compressed air supplied thereto impinges against the seam on both sides and heats the two plies to the point of softening, the bands preventing displacement of the parts of the sheeting situated above the seam. At the same time the parts between the bands, which are to be heat sealed, are pressed together by the pressure of the compressed air. If heat sealing is incomplete by reason of particles of dust lying between the plies, the welded seam is firmly pressed together by the two pressing rolls 13 and 15 during its further passage through the apparatus and thus positively sealed. The welded parts are finally conveyed to the end of the machine adjacent the hinge and there ejected.

What we claim is:

1. A process for continuously and rapidly heat sealing two plies of plastic sheeting which comprises directing a stream of hot compressed air from both sides of the combined sheets onto the seam while said sheets are held at both sides of said seam, said seam being free for the impact of the hot air, conveying said sheets while cooling said seam externally, whereby the seam solidifies on the outside while remaining soft on the inside, pressing together said seam from both sides in order to effect sealing of any unsealed parts of said seam, and removing the sealed sheets.

2. Apparatus for continuously and rapidly heat sealing two plies of plastic sheeting which comprises: a stationary horizontal frame member, a movable horizontal frame member hinged to said stationary frame member, a closing lever for locking the movable frame member to the stationary frame member, interengaging tongue and groove on the frame members to prevent relative displacement thereof, three vertical shafts in said stationary frame member and in said movable frame member, two of said three shafts being arranged at the outer ends and one shaft substantially in the middle of said frame members, said outer shafts carrying horizontally rotating metal discs, said discs guiding four steel bands, said bands being driven by suitable means in substantially horizontal planes in two pairs one above the other with a space between them substantially equivalent to the width of the welded seam required, said bands gripping the sheets on both sides of the seam and being reciprocally pressed together, two jets, one on each side of said bands in the stationary frame member and in the movable frame member at a short distance from said sheets to be sealed and at the height of said seam between said pairs of bands, said jets having openings corresponding to the width of seam desired, two air preheaters communicating with said jets, one preheater being arranged in the movable frame member and one preheater in the stationary frame member, said preheaters serving for heating up the compressed air required for sealing, and two motor-driven plastic rollers being guided in said vertical shafts between the outer shafts rotating in the same horizontal plane for reciprocal resilient pressing together of said sheets.

3. Apparatus as claimed in claim 2 comprising resiliently mounted pressing means to tension the bands and equalise any differences in length of individual bands.

References Cited by the Examiner

UNITED STATES PATENTS

| | | | |
|---|---|---|---|
| 2,441,940 | 3/1948 | Rohdin | 156—289 |
| 2,730,160 | 1/1956 | Pickening | 156—497 |
| 2,997,098 | 8/1961 | Riese et al. | 156—497 |
| 3,142,608 | 7/1964 | Techtmann et al. | 156—583 |

EARL M. BERGERT, *Primary Examiner.*

E. G. WHITBY, J. P. MELOCHE,
*Assistant Examiners.*

UNITED STATES PATENT OFFICE
CERTIFICATE OF CORRECTION

Patent No. 3,278,358            October 11, 1966

Horst Rosewicz et al.

It is hereby certified that error appears in the above numbered patent requiring correction and that the said Letters Patent should read as corrected below.

In the heading to the printed specification, between lines 8 and 9, insert -- Claims priority, application Germany, December 14, 1960, B 60482 --.

Signed and sealed this 26th day of September 1967.

(SEAL)
Attest:

ERNEST W. SWIDER            EDWARD J. BRENNER
Attesting Officer            Commissioner of Patents